(12) United States Patent
Gray, Jr.

(10) Patent No.: US 8,375,982 B2
(45) Date of Patent: Feb. 19, 2013

(54) HYDRAULIC CIRCUIT AND MANIFOLD WITH MULTIFUNCTION VALVE

(75) Inventor: Charles L. Gray, Jr., Pinckney, MI (US)

(73) Assignee: The United States of America, as represented by the Administrator of the U.S. Environmental Protection Agency, Washington, DC (US)

( * ) Notice: Subject to any disclaimer, the term of this patent is extended or adjusted under 35 U.S.C. 154(b) by 723 days.

(21) Appl. No.: 12/567,938

(22) Filed: Sep. 28, 2009

(65) Prior Publication Data

US 2011/0073191 A1 Mar. 31, 2011

(51) Int. Cl.
*F16K 15/00* (2006.01)

(52) U.S. Cl. ............ 137/493; 137/493.9; 137/524; 137/527; 137/530; 251/285; 251/303; 251/337

(58) Field of Classification Search .......... 137/522–524, 137/527, 527.8, 530, 531, 493, 439.9, 493.9; 251/298–303, 285, 337
See application file for complete search history.

(56) References Cited

U.S. PATENT DOCUMENTS

| | | | | |
|---|---|---|---|---|
| 2,428,708 A | * | 10/1947 | Heftler | 137/527 |
| 3,807,689 A | * | 4/1974 | Booth | 137/523 |
| 4,614,122 A | * | 9/1986 | Graves | 73/861.74 |
| 4,679,586 A | * | 7/1987 | Riedel et al. | 137/493 |
| 5,394,901 A | * | 3/1995 | Thompson et al. | 137/527 |
| 6,341,622 B1 | * | 1/2002 | McHugh | 137/523 |
| 6,425,412 B2 | * | 7/2002 | Sterling | 137/527 |

* cited by examiner

*Primary Examiner* — Eric Keasel
(74) *Attorney, Agent, or Firm* — David H. Read

(57) ABSTRACT

A hydraulic manifold has features adapted to the needs of hybrid vehicle applications. In one embodiment, multifunction valves selectively regulate fluid flow among primary and auxiliary flow paths. A normally closed butterfly valve is biased by a relatively small secondary biasing force against rotation in first and second (opposite) directions, and by a relatively large principal biasing force against rotation in the first direction past a transitional angular position at which the principal biasing force takes effect. An actuator selectively controls the transitional angular position and the magnitude of the principal biasing force. In the first direction, flow must overcome only the secondary biasing force to pass the valve. In the second direction, any flow sufficient to overcome the secondary biasing force but not the principal biasing force will divide into a first flow passing the valve and a second flow induced to enter an auxiliary path upstream. Additional flow causing the principal biasing force to additionally be overcome will substantially pass the valve as part of the first flow. This and other embodiments provide a manifold that is controllable to allocate flow among primary and auxiliary paths while remaining responsive to sudden large changes in flow independently of immediate control response.

14 Claims, 9 Drawing Sheets

HYDRAULIC CIRCUIT AND MANIFOLD WITH MULTIFUNCTION VALVE

BACKGROUND OF THE INVENTION

1. Technical Field

Embodiments of the present disclosure are related generally to fluid handling in hydraulic power transmission applications, and in particular to hydraulic fluid manifolds.

2. Description of the Related Art

Hydraulic machines are in common use in a wide variety of industrial and commercial applications. Hydraulic machines transmit power by conducting pressurized fluid between low pressure and high pressure reservoirs. Fluid is typically conducted by means of hoses or pipes joined by one or more fluid conducting manifolds that facilitate their connection. It is also known in the art to provide valve means integrated within the body of such manifolds by which flow may be selectively routed in response to operating conditions.

Typically, the low pressure side of a hydraulic circuit will have one or more manifolds dedicated to handling low pressure flow. Auxiliary functions such as fluid filtration or cooling are also likely to reside on the low pressure side, adding to the number of connections that might be plumbed in to the manifold. These auxiliary functions may also require additional flow regulating means such as auxiliary pumps, check valves or proportional valves, adding to the complexity of the circuit.

Application of hydraulic machines and hydraulic circuits to hybrid vehicle powertrains is a relatively new area. These applications present special performance considerations. For fuel efficiency it is important to provide for efficient handling of regenerative braking, which can create very high fluid flow rates at short notice and in a reverse direction from the usual flow. For driver and passenger safety it is also important for the low pressure circuit to provide a reliable pressure relief function to allow pressurized fluid to safely retreat to the low pressure reservoir in case a component failure or other anomaly occurs, such as for example, a "blow-off" event in which the cylinder barrel of a hydraulic motor becomes unseated. In general, it is also important to minimize flow restrictions wherever fluid traverses the manifold at a high flow rate in order to maximize energy efficiency of the vehicle. Vehicular applications are also particularly sensitive to issues that affect weight, packaging, cost, and manufacturability. Ideally the low pressure manifold should integrate into its design as much of the above described functionality as possible, to reduce the number of individual components that must be separately mounted and installed on the vehicle. The hydraulic manifold art has yet to develop standard solutions for these needs. The design of a low pressure manifold for a vehicular application therefore remains a challenging and inventive task.

As suggested previously, one function of such a manifold would be to allocate flow to auxiliary functions such as cooling and filtration of the working fluid. A manifold body can easily provide for multiple fluid passages as well as convenient mounting and integration of valve means to regulate flow within the passages. One might therefore provide for connections to auxiliary paths on which the auxiliary means reside, and selectively induce fluid flow from a primary fluid path into the auxiliary paths by selectively constricting the main fluid path by means of an integrated proportional valve.

The manifold would also need to support rapid discharge to the low pressure side, as well as regenerative flows in a reverse direction. The presence of a proportional valve on the main path might restrict such flows if they were to occur when the proportional valves are closed or partially closed. For example, if a blow-off event were to suddenly occur, the filter and coolers may fail or rupture before the control system has time to detect and respond to the condition by fully opening the proportional valves. As another example, when a regenerative braking event occurs, a slow response might cause a significant portion of the recoverable energy to be lost by passing through the filter or cooler, or through partially closed proportional valves, rather than being more efficiently recovered through a less restricted path. However, a manifold may easily provide for the additional passages and valve means necessary to allow such flows to bypass the proportional valves. For example, regenerative braking flows could be supported independently of the main path by a parallel passage fitted with a flow checking means (such as for example a check valve) to allow only flows toward the high pressure side. Blow-off flows could be supported by another parallel passage with a spring-loaded check valve to allow only particularly large flows toward the low pressure side.

An even greater advantage could be realized if, rather than having separate flow checking means on parallel fluid paths, the function of each of these added paths and flow checking means could be performed by a single valve in the main path. This would call for a unique valve design to be integrated with the manifold.

One form of valve suitable for use in a manifold is the butterfly valve. Butterfly valves are well known in the art and typically include a flat valve member (such as a disc or similar shape) disposed in a fluid channel. The disc is fixed to a rotatable shaft (called a stem) having an axis intersecting the plane of the disc at a point near its center. When the plane of the disc is perpendicular to the fluid channel, the fluid channel is substantially closed to flow. When the plane of the disc is parallel to the fluid channel, the channel is maximally open to flow. The angular positions in between establish proportional control of fluid flow across the valve.

In some applications, a direct actuator such as a hand wheel or a servo motor is used to turn the stem and thereby rotate the disc to a specific angle. These valves typically have a disc that is divided by the axis of the stem into two equally sized wings.

In other applications, the disc is not directly actuated to an angle but instead is biased to a closed position and takes on a flow-induced opening angle in response to the action of fluid flow across the valve. These valves typically have what is commonly known in the art as an offset butterfly disc, in which the axis of the stem divides the disc into two unequal wings, one larger than the other, thereby making the larger wing follow the direction of fluid flow and thereby causing the valve member and stem to rotate in a first direction in response to fluid flow in a first direction, and in a second opposite direction in response to fluid flow in the opposite direction. If the pressure differential across the valve is sufficient to overcome the biasing force, the valve will crack open and fluid flow across the valve will exert a torque rotating the valve to an angle generally corresponding to the rate of flow, until the flow diminishes enough to allow the biasing force to close it again.

A flow-induced butterfly valve with biasing force may therefore act as a sort of relief valve or limited-range check valve that blocks flow only up to a predetermined flow-induced pressure differential. The biasing force is provided by a biasing means, typically including a spring or similar elastic or resilient component, and will vary with the angle of rotation along what could be called a biasing force profile. For example, a valve biased by an ordinary spring would be expected to present a biasing force profile that is a generally linear function of deflection, because spring force F=kx, where k represents the spring constant of a given spring, and x is the deflection.

Unfortunately, standard butterfly valves do not meet every need posed by a vehicular hydraulic manifold. First, most flow-induced butterfly valves are designed to allow flow in one direction and block flow entirely in the other. This would be acceptable in a manifold having parallel unidirectional flow passages but not one that seeks to combine, for example, both regenerative braking and blow-off flows in a single passage. Second, the biasing spring will tend to limit the degree to which fluid flow alone may open the valve. A butterfly disc biased by an ordinary torsion spring having a spring force sufficient to create a strong biasing force at the closed position may be practically incapable of being opened by fluid flow alone beyond an angle of 70 to 80 degrees, perhaps much less. This is largely because the torque exerted on a butterfly disc by fluid flow drops off dramatically as the disc becomes more parallel to the flow direction, until the flow can no longer overcome the biasing force necessary to further rotate the valve.

It would be preferable to provide a selectively controllable biasing means that would allow the biasing force to be selectively reduced so as to allow nearly full opening of the valve (approaching 90 degrees) in order to minimize flow obstruction at high flow rates, where the greatest impact on overall system efficiency is felt. It would also be preferable to allow bidirectional flow, providing a different bias in each direction so that two directions of fluid flow, such as that supporting a drive mode and blow off mode in one direction, and a regenerative braking mode in the opposite direction, can be accommodated in a single flow path, with specific levels of biasing appropriate to each. A butterfly valve having these features would make it particularly suitable for use in a vehicular hydraulic manifold.

Butterfly valves, valve actuators, and hydraulic manifolds are described in a large number of patents, including the following examples and many others. The bulk of prior art in the field of butterfly valves, similar types of valves, and their actuators focuses on direct actuation of the valve to a specific rotation angle (for example, U.S. Pat. No. 4,132,071, No. 4,261,546; No. 7,028,979), or on making the valve return to a closed or open position on failure of the actuator (for example, U.S. Pat. No. 4,132,071), or for faster closing of the valve (U.S. Pat. No. 5,671,903; No. 4,556,192) or for modifying the biasing force acting on the rotation of the disc (for example, U.S. Pat. No. 6,648,013 in which the force necessary to keep the valve open after initially cracking open is reduced, or U.S. Pat. No. 6,938,597 in which the force biasing an intake valve is controllably varied). To the knowledge of applicant there has been no example of a bi-directional butterfly valve with a different biasing force in opposite directions and having an actuator that controls a biasing force in one of the directions, nor have there been examples of the use of such a valve to advantageously regulate fluid flow in a hydraulic manifold.

BRIEF SUMMARY

It is an object of the invention to provide a hydraulic manifold designed specifically to support the unique performance requirements encountered in a hybrid vehicle application.

It is another object of the invention to provide a hydraulic manifold that provides for proportional routing of a target range of fluid flow into auxiliary circuits while allowing flow beyond the target range to avoid the circuits without need for immediate control intervention.

It is another object of the invention to provide a hydraulic manifold with valve means that variably resists fluid pressure to a principal degree in one flow direction, and to a secondary degree in the opposite direction, so as to accommodate rapid changes of flow rate or flow direction without need for immediate control intervention, while retaining proportional control of a target rate of flow across the valve.

It is another object of the invention to minimize the necessary number of valve mechanisms in a vehicular hydraulic manifold by combining the functions of low-threshold check valve, high-threshold relief valve, and proportional valve in a single valve mechanism.

Accordingly the invention comprises several embodiments of a hydraulic manifold having design features addressing the unique needs of hybrid vehicle applications.

In a preferred embodiment, a hydraulic manifold includes a main flow-through path, a low-pressure path communicating with a low pressure reservoir, and two auxiliary paths communicating with a filtration means and a cooling means respectively. One or more multifunction butterfly valves regulate flow within the manifold. A normally closed butterfly disc is biased by a relatively small secondary biasing force against rotation in first and second directions, and by a relatively large principal biasing force against rotation in the first direction beyond a transitional angular position at which the principal biasing force takes effect. An actuator selectively controls the principal biasing force and the transitional angular position. More specifically, the multifunction valves each comprise a rotatable stem, a cam, and an offset butterfly disc disposed in a fluid channel. An extension spring determines the secondary bias against rotation in both directions. An actuator controls the additional principal bias against rotation past the transitional rotation angle in the first direction, by establishment of a position of a cam follower that yieldably restrains the cam when in contact with it. The position of the cam follower is controlled by a cam follower positioning means. Here, the cam follower positioning means includes a motor and screw mechanism that restrains the cam follower against a compression spring, thereby establishing the magnitude of the principal biasing force and the cam rotation angle at which it begins yieldably resisting rotation of the cam in the first direction. The valve is thereby able to act as a low-bias-force check valve in either direction, while simultaneously acting as a high-bias-force relief valve and a flow-induced proportional valve in the first direction. In the second direction, any flow sufficient to overcome the secondary biasing force will pass the valve. In the first direction, by control of the actuator, a target range of flow rates sufficient to overcome the secondary biasing force but not the principal biasing force will be divided into a flow passing the valve and a flow induced to enter an auxiliary path upstream. Any additional flow sufficient to overcome the principal biasing force will pass the valve.

In another embodiment, a hydraulic manifold includes one or more fast acting direct actuation butterfly valves regulating flow within the manifold. A butterfly disc is directly actuated by a controller to restrict a main fluid path and thereby induce some portion of the flow into an auxiliary path. Regenerative braking flows are handled by a first parallel path fitted with a flow checking means such as a check valve to ensure unidirectional flow. Blow-off flows are handled by a second parallel path fitted with a strongly biased check valve to ensure a unidirectional flow and only at high flow rates.

In yet another embodiment, the function of the parallel path for regenerative braking is provided in the main fluid path by use of a butterfly valve having a one-way actuation in which flow in a reverse direction is allowed to pass but flow in the opposite direction is restricted by an actuation setting controlling the position of the disc.

BRIEF DESCRIPTION OF THE SEVERAL VIEWS OF THE DRAWINGS

FIG. 5b is a sectional view of the actuator of FIG. 5a taken along plane A-A of FIG. 5a.

DETAILED DESCRIPTION

Additional background regarding hydraulic hybrid vehicles may be found in U.S. Pat. No. 7,456,509 entitled METHODS OF OPERATING A SERIES HYBRID VEHICLE; U.S. Pat. No. 6,876,098 entitled METHODS OF OPERATING A SERIES HYBRID VEHICLE; U.S. Pat. No. 6,719,080 entitled HYDRAULIC HYBRID VEHICLE; and U.S. Pat. No. 5,495,912 entitled HYBRID POWERTRAIN VEHICLE; all issued to applicant and incorporated herein by reference in their entireties.

Figure 1:
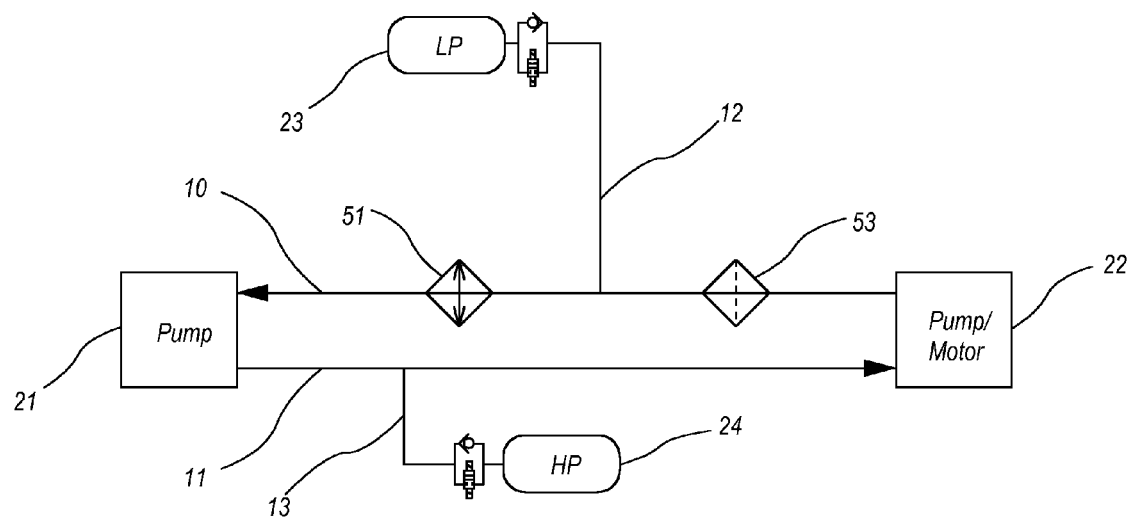
FIG. 1 is a schematic of a hypothetical hydraulic circuit for a series hydraulic hybrid vehicle, having potential inefficiencies.

FIG. 1 shows some primary components that would likely be present in a series hydraulic hybrid vehicle, arranged in a simple hydraulic circuit, but one that is not well optimized for performance. Pump 21 is driven rotationally by an internal combustion engine (not shown), acting to pressurize a working fluid. Drive pump/motor 22 is powered by the working fluid to provide motive power to the vehicle. Fluid processing means includes filter 53 provided for fluid filtration and cooler 51 provided for fluid cooling. Hydraulic fluid paths 10 and 12 represent the low pressure side of the hydraulic circuit. Hydraulic fluid paths 11 and 13 represent the high pressure side of the hydraulic circuit. Low pressure accumulator 23 provides storage of low pressure fluid, and high pressure accumulator 24 provides storage of high pressure fluid.

A fluid circuit for a hydraulic hybrid vehicle typically will provide for several distinct operational functions. These may include: a drive function, in which motive power is delivered to the wheels to meet driver demand; a launch function, similar to the drive function but specifically for accelerating from a stop; a regenerative braking function, in which the vehicle is slowed by recovering kinetic energy from the wheels and using it to pressurize fluid; a recharge function, in which the high pressure accumulator receives pressurized fluid for storage; and a blow-off function, which is a failure mode in which high pressure fluid is relieved to the low pressure side of the hydraulic circuit. These functions may take place independently as distinct modes of operation, or may operate concurrently in different parts of the hydraulic circuit at different times, depending on the specific operating strategy employed and the operating conditions encountered. In this disclosure, each function will be referred to as a mode while recognizing that it need not occur independently of the others.

In drive mode, the primary function of pump 21 is to provide pressurized fluid to drive pump/motor 22. Pump 21 receives low pressure fluid from the low pressure discharge of drive pump/motor 22 through low pressure path 10. Pump 21 then pressurizes the fluid, and sends it through high pressure path 11 to drive pump/motor 22. Flow rates in this mode may be quite large depending on acceleration rates, vehicle speed and terrain. This mode may occur frequently and for relatively long durations compared to the other modes. Pump 21 may also function as a motor to start its drive engine (not shown).

In regenerative braking mode, drive pump/motor 22 is operated as a pump to recover energy from the motion of the vehicle during a braking event. In this mode fluid is drawn from low pressure accumulator 23, pressurized by pump/motor 22, and sent to high pressure accumulator 24. Since a large amount of energy is potentially recoverable in a braking event from a highway speed to a full stop, accordingly large flow rates may be expected in this mode.

In launch mode, high pressure fluid will flow from high pressure accumulator 24 to power drive pump/motor 22 and then to low pressure accumulator 23. A large amount of energy and accordingly high flow rates could be encountered if the driver is accelerating rapidly to highway speed.

In recharge mode, pump 21 receives low pressure fluid from low pressure accumulator 23, pressurizes it, and sends it to high pressure accumulator 24.

In a pump/motor blow-off condition, such as when drive pump/motor 22 fails by unseating of the cylinder barrel or a similar failure resulting in a need for relief of high pressure fluid, pressurized fluid will flow from high pressure accumulator 24 through a substantially open circuit within pump/motor 22 and into low pressure accumulator 23.

It can now be seen that the fluid passages by which fluid travels among the primary components of the circuit must support a variety of flow directions, routings, and flow rates depending on the operating mode.

Looking again at the circuit of FIG. 1, some particular inefficiencies become apparent, including: (a) all fluid flow in low pressure path 10 must pass through a fluid processing means (filter 53 and/or cooler 51) in any drive or discharge mode and experience associated losses even though filtration and cooling may not always be necessary or desirable in all modes at all times; (b) filter 53 must support a very high flow rate, and in a reverse direction during regenerative braking; (c) reverse flow across filter 53 would be problematic because it may release previously filtered contaminants back into the fluid; (d) if there were a sudden need for relief of high pressure fluid from pump/motor 22 to the low pressure side, filter 53 would restrict this flow and may either sustain damage to itself or prevent the pressure from being relieved in a safe and controlled way.

Figure 2A:
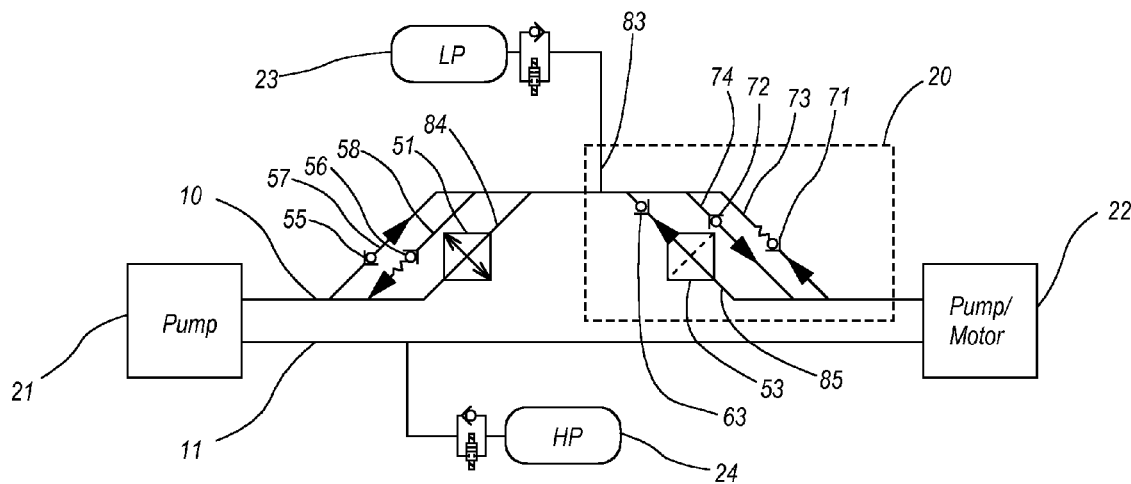
FIGS. 2a and 2b depict a schematic of a hydraulic circuit for a series hydraulic hybrid vehicle of a first embodiment of the invention, with additional fluid paths and components addressing the inefficiencies of the circuit of FIG. 1.

These shortcomings may be partially addressed by providing additional passages and valves as shown in FIG. 2a according to an embodiment of the invention. Filter 53 now resides on path 85 with check valve 63 acting to enforce unidirectional flow across the filter. Similarly, cooler 51 now resides on auxiliary path 84. Passage 73 and spring-biased check valve 71 have been added to allow rapid fluid flows to bypass filter 53 in case of failure of pump/motor 22, in which case the resultant high flow rate would cause spring-biased check valve 71 to open and allow pressurized fluid to pass safely. Passage 74 and check valve 72 have also been added to allow regenerative braking flows to bypass filter 53. Optionally, spring-biased check valve 56 and passage 58 may be added to allow rapid fluid flows to partially bypass cooler 51 to prevent pump 21 from cavitating. Also optionally, check valve 55 and passage 57 may be added to allow rapid fluid flows from pump 21 to the low pressure accumulator 23 to bypass cooler 51 in case of failure of pump 21. Many of these items may be integrated into a single manifold means indicated in FIGS. 2a and 2b as manifold 20, for example.

Figure 2B:
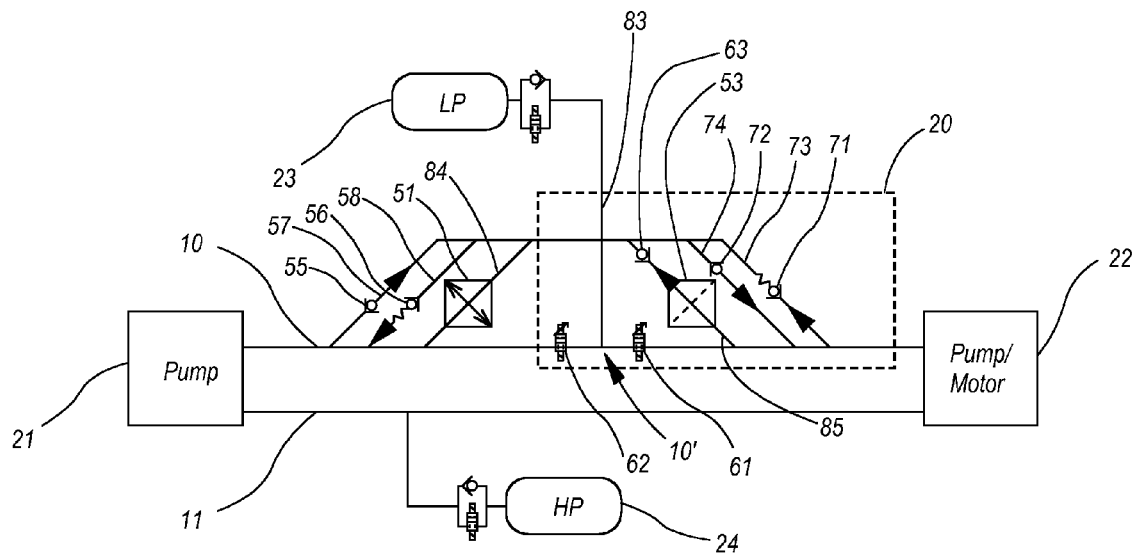

Referring now to FIG. 2b, another embodiment is shown in which path 10' and proportional valves 61 and 62 are added. Proportional valve 61 may selectively restrict flow on low pressure path 10', thereby selectively inducing a portion of flow heading from pump/motor 22 into filter 53, or may open to allow some or all of the flow to bypass the filter to reduce the energy loss associated with the pressure drop of flow through the filter. Similarly, proportional valve 62 may selectively restrict flow to induce a portion of flow that would otherwise flow directly to pump 21 instead through cooler 51, or in the open position (for example when cooling is not needed) bypass the cooler and eliminate its pressure drop.

Low pressure accumulator path 83 may be introduced into the low pressure circuit at various other locations instead of that depicted. For example, it could connect to path 10 between pump 21 and the intersection of path 10 with path 57, to provide the lowest pressure drop to pump 21 for charging high pressure accumulator 24.

Another embodiment of the invention recognizes that, if proportional valves 61 and 62 could be modified to also perform the functions of spring-biased check valve 71 and check valve 72 (by means of a modified valve 61) and the functions of spring-biased check valve 56 and check valve 55 (by means of a modified valve 62), then valves 71, 72, 55, and 56, and passages 73, 74, 57, and 58 could be eliminated.

Although low pressure accumulator path 83 is shown as part of the preferred embodiment, it is not necessarily an essential part of all embodiments of the inventive circuit covered by this disclosure. A hydraulic circuit according to the invention may be recognized independently of a connection to a low pressure source when it is employed for a pure hydrostatic drive mode in which fluid is continually exchanged between a pump (such as pump 21) and a drive pump/motor (such as pump/motor 22). Similarly, although it is to be understood by those skilled in the art that a hydraulic circuit according to the invention would likely include a high pressure accumulator as part of the overall system in which the invention is applied, the inventive aspects of the invention may be recognized independently of that portion of the circuit.

Figure 3:
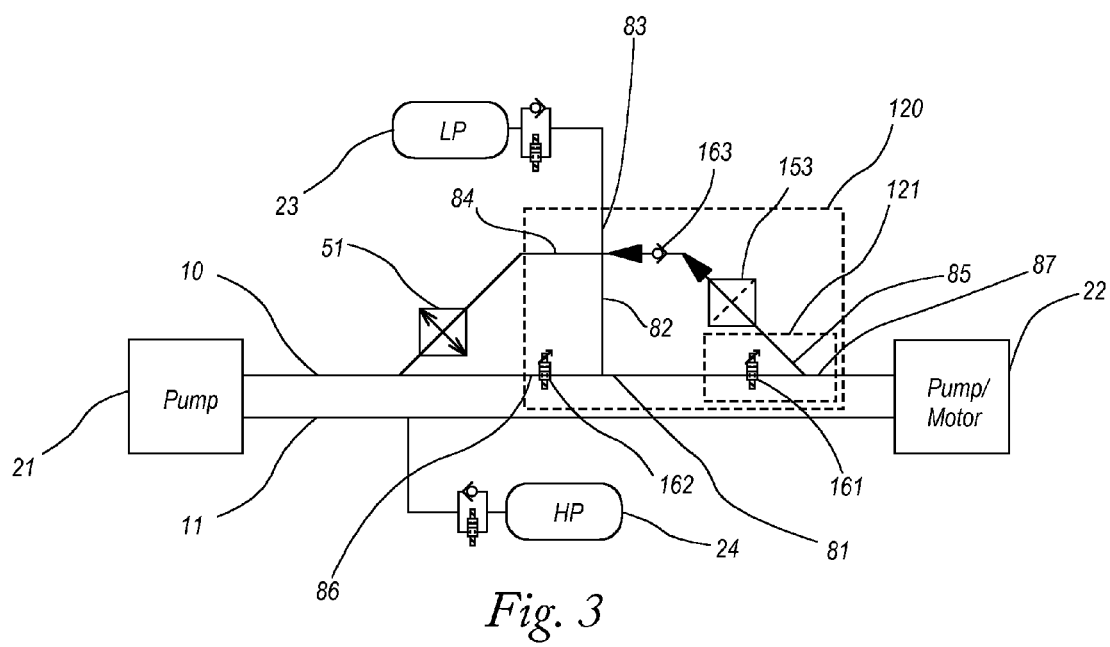
FIG. 3 is a schematic of an improved hydraulic circuit including a low pressure manifold according to a second embodiment of the invention.

Referring now to FIG. 3, a modified hydraulic circuit (and manifold) according to a preferred embodiment of the invention is depicted, employing multifunction valves 161 and 162 in place of valves 61 and 62 of FIG. 2b. The one unidirectional flow path is indicated with arrowheads showing the direction of flow, while other paths are bi-directional. Multifunction valve 161, multifunction valve 162, check valve 163, main flow path 81, low pressure accumulator path 83, cooler path 84, filter path 85, pump path 86, drive pump/motor path 87, and common path 82 that joins the foregoing paths, as well as filter 153, may optionally be integrated into a manifold 120. Alternatively, instead of manifold 120, the multifunction valve 161, filter path 85, and drive pump/motor path 87 may be integrated into a manifold 121.

In the depicted circuit, multifunction valves 161 and 162 must be of a unique design that can accommodate the widely varying flow rates and reversals of flow expected of the various modes previously described, as effectively as the multiple valves and paths that were eliminated from the embodiments of FIGS. 2a and 2b, and preferably without relying on control intervention to detect such changes and instantly adjust the valve settings. The specific design of the multifunction valves will be detailed after first outlining their placement and necessary behavior in the context of the hydraulic circuit and manifold described in the following discussion.

Figure 4A:
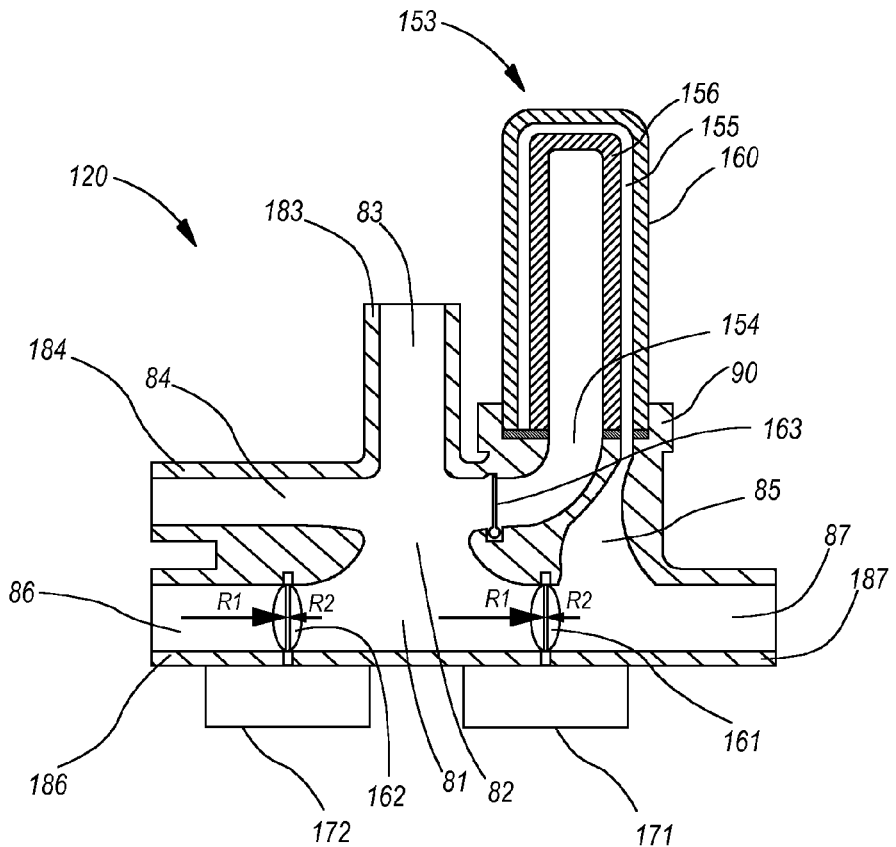
FIG. 4a is a sectional view of a low pressure hydraulic manifold with multifunction valves according to an embodiment of the invention.

FIG. 4a shows a sectional view of a preferred embodiment of manifold 120. Manifold 120 is preferably formed as a metal casting, establishing several ports including: drive pump/motor port 187 that provides for connection with the low pressure feed of a drive pump/motor; filter port 90 that supports flow into and out of a filter cartridge 160; low pressure accumulator port 183 that provides for connection with a low pressure accumulator; cooler port 184 for connection with a fluid cooler; and pump port 186 providing for connection with the low pressure feed of an engine pump. Drive pump/motor port 187 defines drive pump/motor path 87, which branches into filter path 85 and main path 81, communicating with main path 81 by means of multifunction valve 161. Fluid entering filter path 85 proceeds into filter 153 (for example, into filter interstitial space 155 and through filtration medium 156), into filter outlet path 154 and across unidirectional check valve 163 into common path 82 (check valve 163 may equivalently be placed in path 85 instead of in path 154, if packaging or other considerations warrant). From there it may proceed to low pressure path 83, cooler path 84, or pump path 86. Bi-directional multifunction valve 162 controls fluid flow from common path 82 (or main path 81) into pump path 86.

In a preferred embodiment, valves 161 and 162 each have an offset butterfly disc, supporting bi-directional flow, and are biased to a closed position by a relatively small secondary biasing force against flow in first and second (opposite) directions, and selectively biased by a selectively variable principal biasing force against flow in the first direction from drive pump/motor path 87 toward main path 81. The net resistances to flow in the first and second directions (left and right, respectively) are indicated as R1 and R2, which act in the direction opposite to the flow they resist. The relative sizes of the indicated arrows are not to be taken as indicative of actual magnitudes but only that one resistance is significantly greater than the other. Actuator 171 controls the magnitude of the principal biasing force and the rotation angle of valve 161 at which the principal biasing force becomes active. Similarly, valve 162 is normally closed, being biased by a relatively small secondary biasing force against flow in the first and second (opposite) directions, and selectively biased by a selectively variable principal biasing force against flow in the first direction from main path 81 toward pump path 86. Actuator 172 similarly controls the magnitude of the principal biasing force for valve 162 and the valve rotation angle at which it becomes active.

Figure 4B:
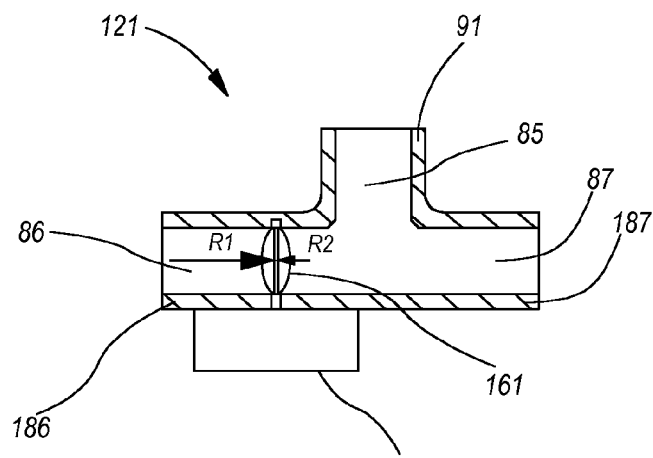
FIG. 4b is a sectional view of a low pressure hydraulic manifold with a multifunction valve according to an embodiment of the invention.

Multifunction valves 161 and 162 thereby prevent flow below a first very low flow rate from passing in either direction; allow flow to pass in the second direction with minimal resistance (left to right as seen in FIGS. 4a and 4b); and selectively allow flow in a selectable range above the first flow rate and below a second flow rate in the first direction (right to left as seen in the figure), as determined by the actuator setting; and above a specified resistance allow very high flow above the second flow rate in the first direction. This functionality is employed to induce a target range of flow rates to be divided into (a) a stream feeding filter 153 or auxiliary path 84 (to a cooler or other device), and (b) a stream passing the respective valve, while allowing incremental flow past the target range to pass the respective valve without control intervention.

FIG. 4b shows a sectional view of an embodiment of manifold 121, a much simpler application that also benefits from the behavior of the multifunction valve. Manifold 121 establishes several ports including: drive pump/motor port 187 that provides for connection with the low pressure feed of a drive pump/motor; filter port 91 leading to a fluid filter or other fluid processing means; and downstream port 186 leading to the low pressure feed of an engine pump or other downstream portion of a hydraulic circuit. Bi-directional multifunction valve 161 controls fluid flow from drive pump/motor path 87 to downstream path 86. Similarly to its role in the embodiment of FIG. 4a, selective actuation of multifunction valve 161 of FIG. 4b induces a target range of flow rates to be divided into a stream feeding filter path 85 and a stream passing valve 161, while allowing incremental flow past the target range to pass valve 161 without control intervention.

The specific behavior of multifunction valves 161 and 162 in supporting the fluid flows associated with each operating mode will now be detailed. The discussion may be followed with reference to either FIG. 3 or FIG. 4a.

In drive mode and launch mode, the primary driver of flow is the drive pump/motor which must discharge fluid to the low pressure manifold. In either mode, flow through manifold 120 enters at drive pump/motor path 87 and may continue through filter 153 or past multifunction valve 161. By its actuation, multifunction valve 161 apportions flow to the two destinations by establishing (a) a transitional rotation angle up to which fluid may open the valve by overcoming only the first pressure differential; and (b) a second pressure differential necessary to open it past the transitional angle. If the flow pressure from path 87 (including the back pressure of any fluid induced into filter path 85) is not sufficient to overcome the first pressure differential (usually very small), substantially all flow will be induced to pass through filter 153 (minus any leakage that might occur across the closed valve member). If the pressure is sufficient to overcome the first pressure differential, but not the second pressure differential, then valve 161 will open to a proportionally corresponding angle but not beyond the transitional angle, allowing a corresponding portion of the flow to pass valve 161, and thereby avoid filter 153. If unactuated, the transitional angle is zero, and therefore substantially no fluid (except for any leakage) will pass valve 161 unless the second differential is reached. If the flow is sufficient to overcome the second pressure differential, valve 161 opens beyond the transitional angle, allowing any additional flow to pass valve 161, thereby effectively limiting the induced flow through filter 153 to an acceptable rate.

Continuing, if in launch mode, fluid that passes filter 153 and/or valve 161 is destined for low pressure path 83 (to the low pressure accumulator). Because pump 21 is not in operation and therefore not accepting fluid, there will be no significant flow into cooler path 84 or pump path 86. Additionally, valve 162 presents a relatively large principal biasing force against flow into pump path 86 if it is unactuated, or at least a relatively small secondary biasing force if it is actuated.

Continuing, if in drive mode, fluid that passes filter 153 and/or valve 161 could be destined for any of: low pressure path 83 (to the low pressure accumulator), or cooler path 84 (to the cooler means), or past valve 162 into pump path 86. Generally, in a closed-loop drive mode, fluid is actively demanded by pump 21 and so will not simply retreat to low pressure path 83, instead being encouraged to remain in the closed loop. In this state, multifunction valve 162 apportions flow between cooler path 84 and pump path 86 by means of its actuation setting as previously described for valve 161. If the flow pressure presented to valve 162 (including the back pressure of any fluid entering cooler path 84) is not sufficient to overcome the first pressure differential, substantially all flow will be induced to enter cooler path 84. If the flow is sufficient to overcome the first pressure differential, but not the second pressure differential, then the flow will open valve 162 to a proportionally corresponding angle up to a transitional angle, allowing a corresponding portion of the flow to pass, and thereby bypass the cooler. If unactuated, the transitional angle is zero, and therefore substantially no fluid will pass valve 162 unless the second differential is reached. If the flow is sufficient to overcome the second pressure differential, valve 162 then opens beyond the transitional angle, allowing any additional flow to pass valve 162, thereby effectively limiting the induced flow through the cooler to an acceptable rate.

In order to minimize flow obstruction in drive mode, valves 161 and 162 may both be actuated fully, minimizing the proportion of fluid induced through auxiliary paths 85 and 84 (to the filter and cooler, respectively) and maximizing the flow-induced opening angle of valves 161 and 162 by increasing the transitional angle up to 90 degrees, effectively eliminating the principal biasing force against flow in the first direction.

In blow-off mode, the primary driver of flow is, again, discharge from the drive pump/motor. Flow through manifold 120 enters from drive pump/motor path 87, but at a substantially higher flow rate than would be expected in drive or launch mode. Accordingly this flow is expected to generate a pressure differential that will easily overcome the principal biasing force pertinent to valve 161, thereby allowing the bulk of the flow to pass valve 161 and proceed to low pressure port 83 without being restrained by filter 153. Additionally, fluid flow has little potential to pass valve 162 and into pump path 86, being resisted by the principal biasing force of valve 162, and the greater capacity of the low pressure accumulator 23 to serve as a pressure sink for such a flow.

In regenerative braking mode, the primary driver of flow is fluid demand by the drive pump/motor which now, acting as a pump, must draw fluid from the low pressure manifold. Accordingly, flow through manifold 120 occurs in a reverse direction from that of blow-off mode, entering at low pressure path 83. From there it is prevented from entering filter 153 by check valve 163 and instead will pass valve 161 in the second direction for which only the relatively small secondary biasing force must be overcome. Because the secondary biasing force is very small compared to the large flow rate, fluid will pass relatively unobstructed to continue through path 87 to the drive pump/motor. The actuation state of valve 161 does not affect the secondary biasing force in the second direction and therefore will not affect fluid flow in this mode no matter what its current state and therefore actuator 171 does not need to react. Also, due to the demand for fluid at the drive pump/motor, fluid flow has little potential to pass valve 162 and into pump path 86, being resisted by the principal biasing force of valve 162.

In recharge mode, the primary driver of flow is the fluid demanded by the engine pump. Accordingly fluid enters manifold 120 through low pressure port 83 destined for the pump. At check valve 163 it is prevented from entering filter 153. At valve 161 it is prevented from entering drive pump/motor path 87 by the secondary biasing force against opening in the second direction. Although this biasing force is relatively small it is sufficient to prevent cracking of the valve, because of suction in the other direction by pump 21. Fluid is then apportioned between cooler path 84 and pump path 86 by the actuation setting of valve 162 in a manner like that described previously.

It should now be apparent by the foregoing discussion that multifunction valves 161 and 162 have facilitated the flow routing needs posed by the various modes of a hydraulic hybrid vehicle by providing a principal resistance to flow in a first direction and a secondary resistance to flow in a second direction while providing for selective degrees of relatively unrestricted flow in the first direction by means of their actuation.

It should be noted that variations of the circuit having only one multifunction valve (for example, only valve 161 or valve 162) are also possible and fall within the scope of the disclosed invention. For example, referring again to FIG. 3, one could (a) omit multifunction valve 162, or (b) omit multifunction valve 162 and path 86, or (c) omit multifunction valve 162, path 84, and cooler 51, or similar variations, while still retaining many of the advantages offered by the invention over the prior art.

A preferred means by which the necessary behavior of the multifunction valves 161 and 162 is achieved is now detailed.

Figure 5A:
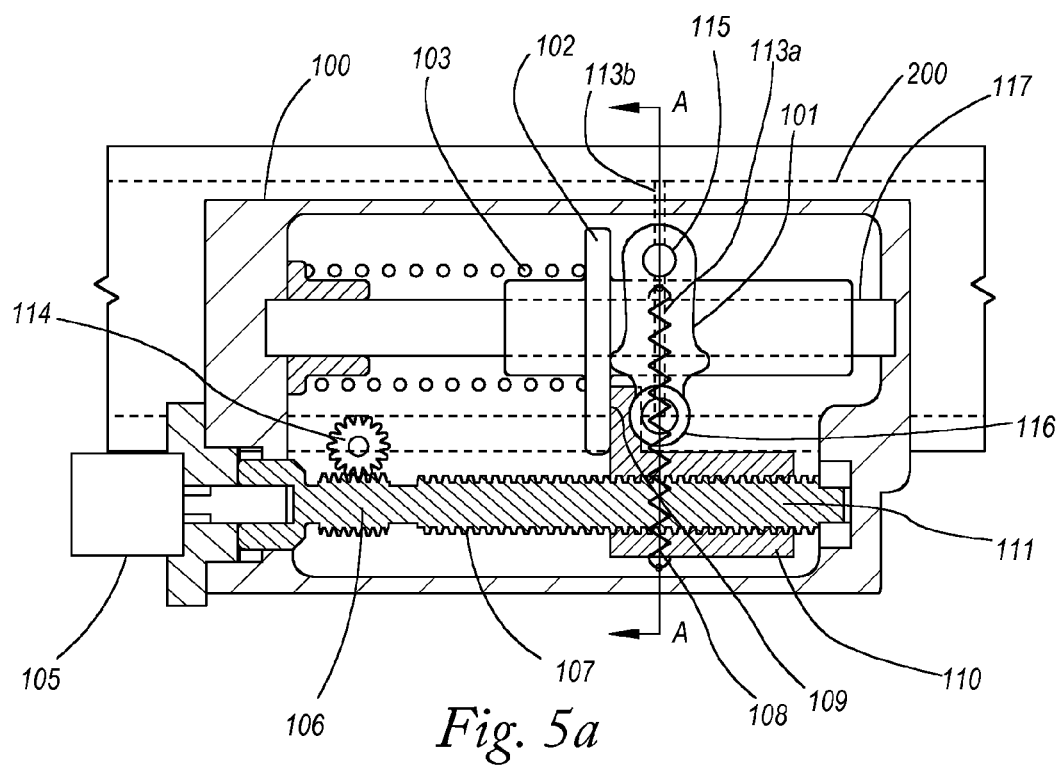
FIG. 5a is a partial sectional view of a valve actuator in which the valve is not actuated and in a closed position.
Figure 5B:
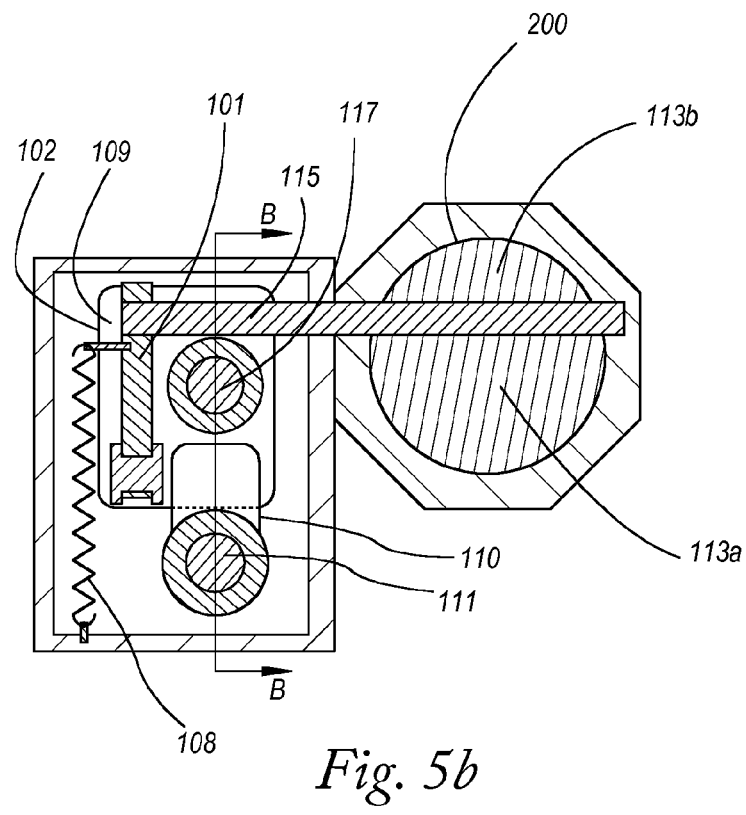
Figure 5C:
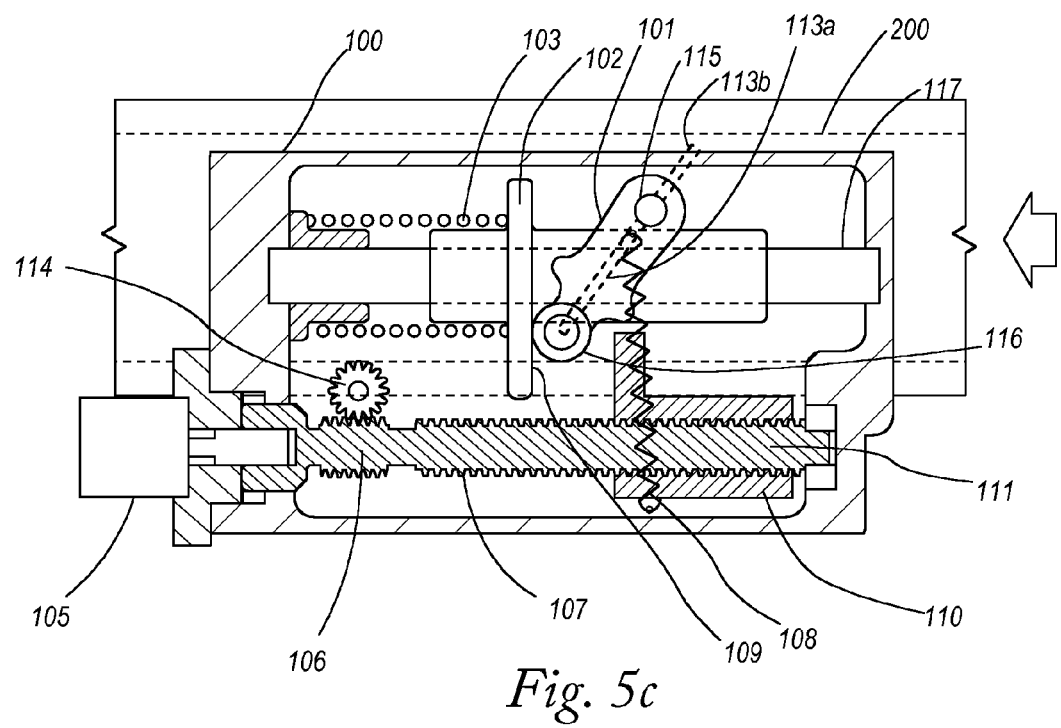
FIG. 5c is a partial sectional view of the valve actuator of FIG. 5a in which the valve is not actuated and fluid flows in the first direction against the principal biasing force.

FIGS. 5a-5f show an actuator by which the biasing force of the multifunction valve is controlled. FIG. 5a is a partial sectional view taken along plane B-B of FIG. 5b, and FIG. 5b is a section taken along plane A-A of FIG. 5a. Referring to FIG. 5a, butterfly disc 113, represented in the Figures by butterfly wings 113a and 113b, is disposed in fluid channel 200. Fluid flows in fluid channel 200 in a first direction to the left or in a second direction to the right. Butterfly disc 113 is rigidly connected to stem 115 which intersects disc 113 substantially parallel to its plane. The intersection of stem 115 with butterfly disc 113 is preferably offset from the diametric center of butterfly disc 113, generally dividing butterfly disc 113 into two substantially semicircular butterfly wings 113a and 113b, one of which is larger in area than the other. Here wing 113a is the larger wing and therefore follows the direction of fluid flow, thereby determining the direction of rotation of the disc in response to a direction of fluid flow across it, and so ultimately determining which direction of fluid flow encounters only the secondary biasing force and which the principal and secondary biasing force. Stem 115 is in turn rigidly connected to cam 101 so that cam 101 and butterfly disc 113 rotate about the longitudinal axis of stem 115. Cam 101 is generally free to rotate but is optionally biased into the depicted closed position (referred to as the angular home position) by force exerted by extension spring 108 which is attached at one end to cam 101. Additionally, cam 101 is yieldably resisted against rotation in one direction (as depicted, clockwise) by contact with cam follower surface 109 of cam follower 102. Cam roller 116 optionally resides on cam 101 to provide a relatively frictionless contacting point through at least a portion of its range of contact with cam follower surface 109. Cam follower 102 slides along rod 117 and in so doing may compress spring 103, establishing a cam follower biasing force by receiving any spring compression force exerted by spring 103 and thereby providing resistance to rotation of cam 101, and therefore butterfly disc 113, in a clockwise direction. Spring 103 thereby acts as a cam follower biasing means. Motor 105 receives a control signal causing threaded rod 111 to rotate by an amount represented by the control signal. Rotation of threaded rod 111 causes cam follower positioning means 110 to travel longitudinally along threaded rod 111 to a corresponding position. If the position thereby attained by cam follower positioning means 110 brings it into contact with cam follower surface 109 and thereby moves cam follower 102 into the compression zone of spring 103, then spring 103 will be compressed by a commensurate amount, thereby presenting a force against any movement of cam follower surface 109 by clockwise rotation of cam 101. By this process, the relative magnitude of the compression force resisting clockwise rotation of cam 101, and the angle of cam rotation at which cam follower surface 109 begins to contact and thereby translate this resistance to cam 101, may be controlled to a desired setting. Optionally, worm gear 114 is rotated by progress of threaded rod 111 and is provided with a rotation sensor (not shown) by which a controller may track the current actuation state of the actuator.

FIGS. 5a and 5b show the actuator in an unactuated state as it would appear when little or no flow pressure is being exerted across the valve in either direction. Accordingly butterfly disc 113 is in a closed position. With the position of cam follower 102 being as depicted in FIG. 5a, spring 103 is at rest and is not under compression by cam follower 102. However, any clockwise rotation of cam 101 will exert a force on cam follower surface 109, causing cam follower 102 to exert a compressive force on spring 103 and thereby resist clockwise rotation of cam 101, and therefore butterfly disc 113, by a commensurate amount. Therefore, in this unactuated state, butterfly disc 113 is biased against counterclockwise rotation by a relatively small secondary biasing force supplied by extension spring 108, and is biased against clockwise rotation by both the secondary biasing force and also a relatively large principal biasing force supplied by the compressive resistance of spring 103. Therefore, fluid flow in the second direction (to the right) must exert only a relatively weak pressure differential against butterfly disc 113 in order to crack the valve, and any fluid flow in the first direction (to the left) must exert a relatively large pressure differential in order to crack the valve.

FIG. 5c shows the actuator again in an unactuated state as it would appear with a very large fluid flow in the first direction (to the left). Accordingly butterfly disc 113 is partially opened to flow in the first direction. It is apparent that the valve is not actuated, because cam follower positioning means 110 has not moved from its previous position. Therefore the opening of the valve is here caused by fluid flow in the first direction causing cam 101 to rotate with sufficient force to overcome both the secondary and principal biasing forces and thereby push cam follower surface 109 (and cam follower 102) to the depicted position. Incidentally, it will also be seen that, owing to the larger degree of rotation of cam 101, optional cam roller 116 now makes contact with cam follower surface 109 so as to minimize friction with cam follower surface 109.

Figure 5D:
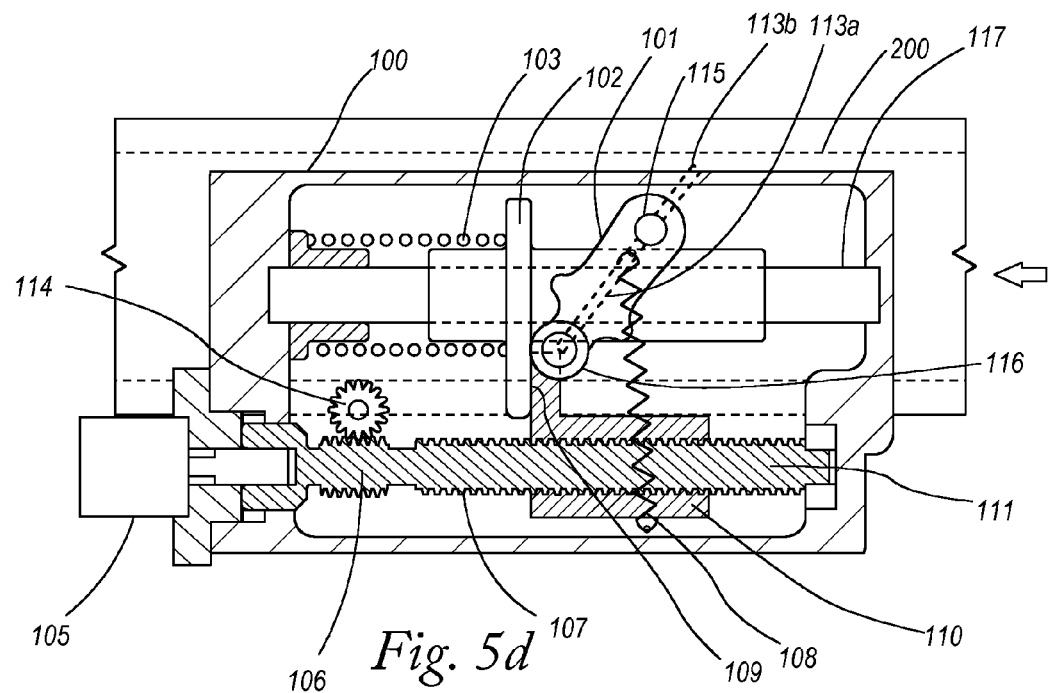
FIG. 5d is a partial sectional view of the valve actuator of FIG. 5a in which the valve is partially actuated and fluid flows in the first direction against the secondary biasing force.

FIG. 5d shows the actuator in a partially actuated state as it would appear with a moderate flow in the first direction (to the left). Actuation has caused cam follower positioning means 110 to move to a new position where it has come into contact with cam follower surface 109 causing this surface and cam follower 102 to travel along with it, and thereby partly compress spring 103. Butterfly disc 113 is again in a partially open position, induced by fluid flow across the valve in the first direction. Because of the new position of cam follower surface 109, cam 101 has encountered only the secondary biasing force in rotating to its depicted position, and the principal biasing force now resists further rotation by means of contact of cam 101 with cam follower surface 109. Therefore it is clear that the fluid flow across butterfly disc 113 in the first direction must be a moderate flow, sufficient to overcome the secondary biasing force until cam 101 encounters cam follower surface 109, but not sufficient to overcome the sum of the secondary and principal biasing forces necessary to rotate it further.

Figure 5E:
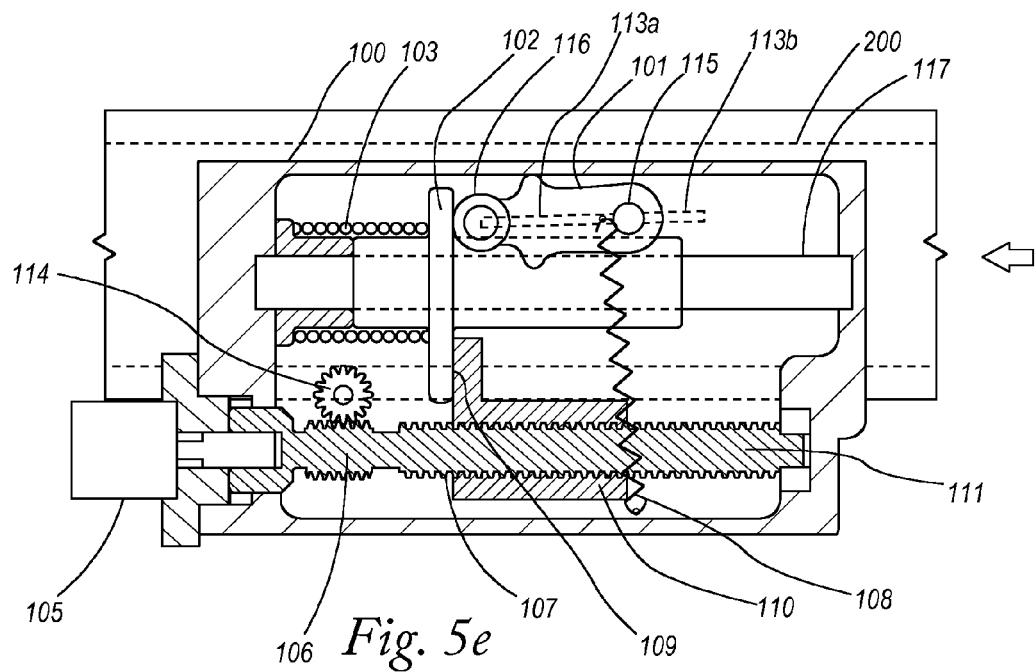
FIG. 5e is a partial sectional view of the valve actuator of FIG. 5a in which the valve is fully actuated and fluid flows in the first direction against the secondary biasing force.
Figure 5F:
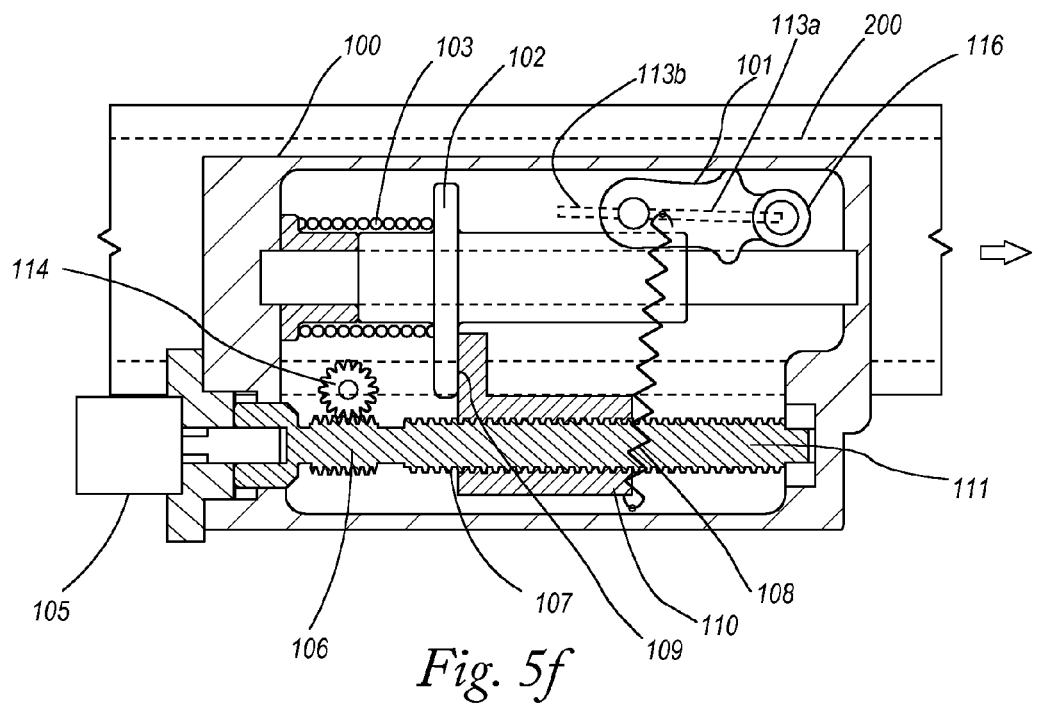
FIG. 5f is a partial sectional view of the valve actuator of FIG. 5a in which the valve is fully actuated and fluid flows in the second direction against the secondary biasing force.

FIG. 5e shows the actuator in a fully actuated state, as it would appear with small, moderate, or large fluid flow in the first direction (to the left). In this state, actuation has caused cam follower surface 109 to move to its extreme position where it no longer restrains rotation of cam 101 at any angle. Butterfly disc 113 is in a fully open position induced by fluid flow across the valve in the first direction. Therefore in attaining the depicted position of butterfly valve 113, fluid flow across the valve in the first direction need only have overcome the secondary biasing force and so may be a small, moderate or large flow. This fully actuated state presents the smallest possible resistance to flow in the first direction according to the invention, and would be invoked whenever flow resistance is desired to be at a minimum and inducement of flow to auxiliary paths is of secondary importance.

FIG. 5f shows the actuator again in a fully actuated state, but with the valve in a fully open position induced by fluid flow in the second direction (to the right). This case merely illustrates that the actuation state does not affect resistance to flow in the second direction but only in the first. Here, fluid flow across butterfly valve 113 in the second direction has been sufficient to overcome the secondary biasing force exerted by extension spring 108 so as to rotate it to its fully open position allowing fluid to pass the valve.

Figure 5G:
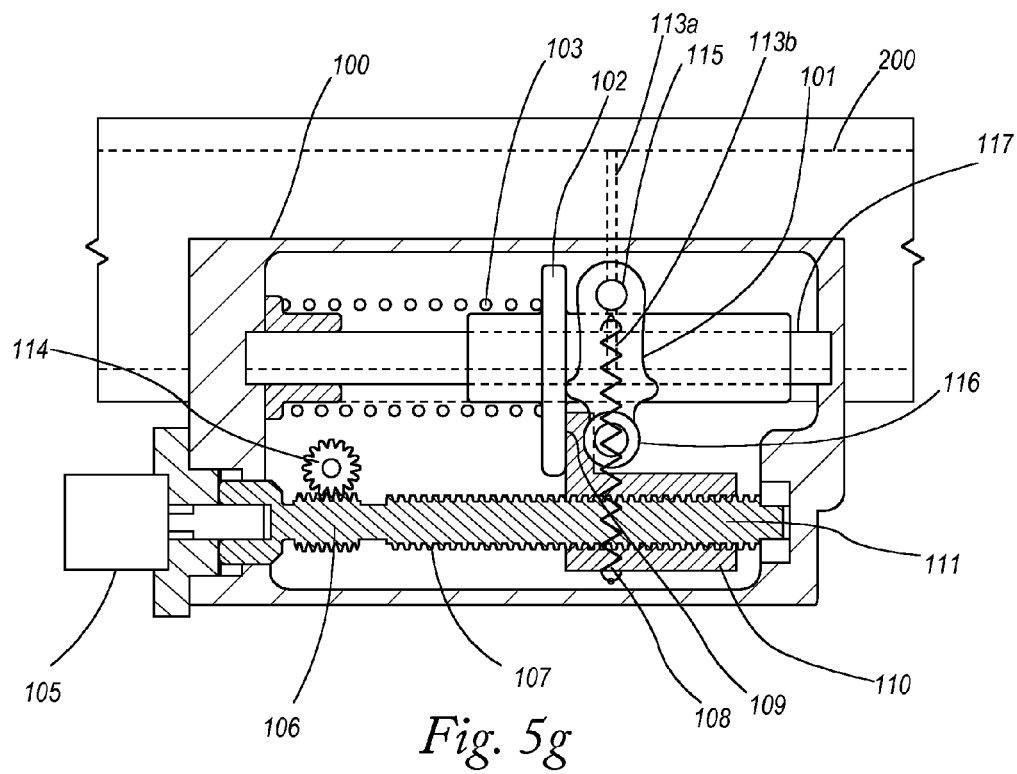
FIG. 5g is a partial sectional view of the valve actuator of FIGS. 5a-5f, but in which the orientation of the butterfly disc with respect to the cam is reversed, in order to show how the secondary and principal biasing forces may be effectively reversed in their action relative the fluid flow.

FIG. 5g shows another embodiment in which the principal biasing force is reversed in its action, simply by reversing the mounting of butterfly disc 113 on its stem so that the larger butterfly wing 113a is now on the opposite side of the stem. Therefore as fluid flows across the disc, the rotation of butterfly wing 113a in following the flow will now encounter the principal biasing force in a rotational direction opposite that of the embodiments of FIGS. 5a-5f. The choice of orientation of the butterfly disc thereby determines the specific flow direction in which the principal biasing force and resultant resistance to flow will act in a given installation of the device. The same effect may alternatively be obtained by rotating the entire actuator/valve assembly by 180 degrees with respect to the flow channel, rather than reversing the mounting of the disc.

In another embodiment, the selective positioning capability of the actuator is eliminated and the actuator set to a fixed actuation state, simply by eliminating motor 105 and threaded rod 106, and fixing cam follower positioning means 110 to a single position relative housing 100. This embodiment provides a lower cost option for applications that do not require a plurality of actuation states.

Figure 6:
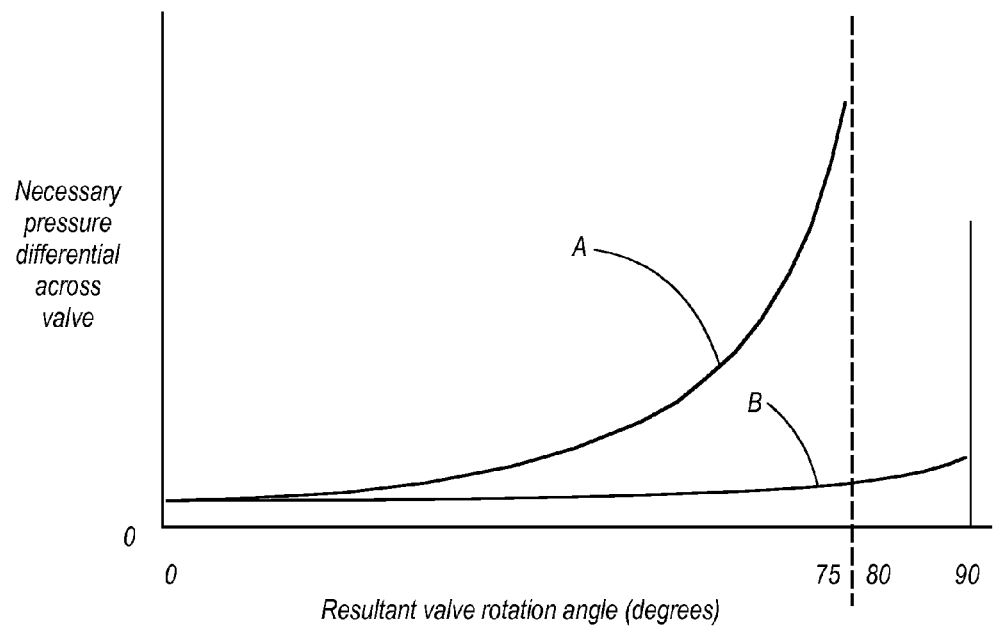
FIG. 6 is a two dimensional graph showing an example of the valve rotation angle of a spring biased butterfly disc as a function of pressure differential across the valve.

FIG. 6 illustrates the advantage of the invention over prior art in attaining a maximum open position in response to fluid flow across the valve. Line A represents a valve that is biased in the ordinary way by means of a relatively strong spring attached to the stem against its rotation, providing a biasing force similar to the principal biasing force. This valve is unlikely to ever open completely by the effect of fluid flow alone, instead only opening to a maximum angle of perhaps 75 to 80 degrees even under a very large pressure differential. By contrast, a valve according to the invention will, when fully actuated, impose only the relatively small secondary biasing force, thereby allowing the valve to reach a more completely open position in response to fluid flow, as illustrated by line B.

In another embodiment, extension spring 108 is eliminated, in turn eliminating the secondary biasing force. In this embodiment, flow in either direction is not opposed by any biasing force, except by the principal biasing force which resists flow in the first direction after attaining its transitional angle.

Figure 7:
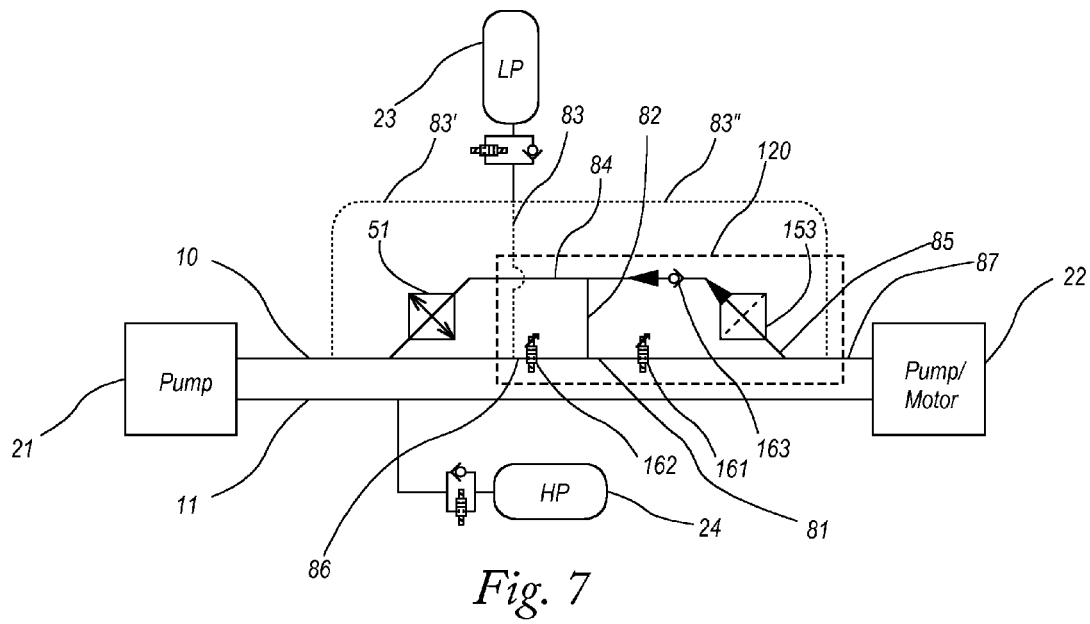
FIG. 7 is a schematic of a hydraulic circuit illustrating several alternate embodiments of the invention, in each of which the connection to the low pressure accumulator has been relocated.

FIG. 7 illustrates several alternate embodiments distinguished by the location at which the low pressure reservoir is plumbed in to the circuit. This location has an impact on the relative efficiency of the various flows and therefore may be considered in choosing the configuration most appropriate to a specific application. Some alternate locations are indicated by alternative passages 83, 83', and 83" each of which represents a unique embodiment and together suggest a family of alternatives that will now be apparent to those skilled in the art.

Considering the alternative illustrated by low pressure path 83, this embodiment presents a smaller pressure differential to flow from low pressure accumulator 23 to pump 21 by preventing the need for flow across multifunction valve 162. However, it increases the pressure differential encountered by flow from low pressure accumulator 23 to drive pump/motor 22, which now must pass both multifunction valves 162 and 161. Similarly, regenerative braking flow now must pass both multifunction valves 162 and 161 on its way to drive pump/motor 22. Also, fluid in blow-off mode now must pass both multifunction valves 161 and 162 against their principal biasing force, instead of only that of valve 161 in the previous embodiment. The significance of these considerations would naturally be judged with respect to a specific application.

The alternative illustrated by low pressure path 83' is substantially equivalent to that having low pressure path 83, since there are no components interposed between the two locations except for a distance separation. Owing to the distance separation there may be an advantage in handling blow-off flows from pump 21.

The alternative illustrated by low pressure path 83" presents the smallest possible resistance to blow-off flows from pump/motor 22 and to regenerative braking flows. However, in this embodiment filtration and cooling could not take place on flows destined for low pressure reservoir 23 and instead would only occur on flows between pump/motor 22 and pump 21, such as in full hydrostatic drive mode, or in charge mode when fluid travels from low pressure reservoir 23 to pump 21. In charge mode, low pressure fluid must travel a longer path and pass both multifunction valves 161 and 162 on its way to pump 21. Also, if pump 21 is operated as a motor to start the engine, the discharged fluid must travel through a longer path through the circuit to reach low pressure reservoir 23.

Figure 8:
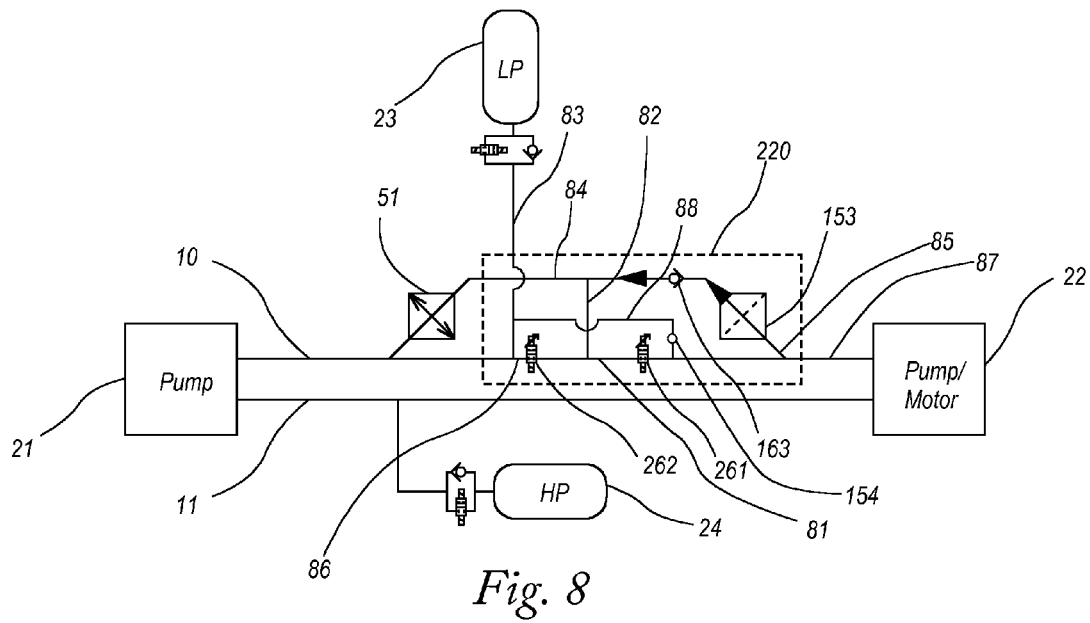
FIG. 8 is a schematic of a hydraulic circuit according to yet another embodiment of the invention, in which the multifunction valves are replaced by fast-control direct-acting proportional valves and the blow-off condition is supported by a passage containing a rupture disc.

FIG. 8 shows yet another embodiment of the circuit in which multifunction valves 161 and 162 of the previous embodiments are replaced with fast acting direct actuation proportional valves 261 and 262. In a direct actuation valve, it is the angle of the butterfly disc, rather than a biasing force, that is controlled by an actuator. With a sufficiently fast control system, and actuators that respond sufficiently quickly to signals from the control system, all operating modes may be provided by this circuit. One disadvantage of this arrangement is in a blow-off mode. If the valves do not open sufficiently quickly, or the system fails to detect the condition sufficiently quickly, escaping fluid would be unable to completely escape across valves 261 and 262 if they happen to be partially or completely closed at the time, and instead a large amount of fluid would be forced through filter 153. This situation is remedied by supplying blow-off path 88 and rupture disc 154 situated upon it. Rupture disc 154 normally closes path 88 to fluid flow but will be breached if presented with a sufficiently large fluid pressure indicative of a blow-off event, thereby opening path 88 for escape of fluid to low pressure path 83 and low pressure reservoir 23.

It will be understood that low pressure path 83 could instead connect to the circuit in a variety of other locations depending on the particular concerns of the application at hand. For example, it could connect at a point between pump/motor 22 and path 85, to provide the least resistant path for blow-off events from pump/motor 22. In this case, filtration would occur only in full hydrostatic drive mode in which fluid exiting the low pressure port of drive pump/motor 22 is demanded by the low pressure intake of engine pump 21 rather than exiting via low pressure path 83.

It will also be understood that the embodiments disclosed may be employed in full hydrostatic drive mode in which the circuit claimed does not explicitly need to include a path to low pressure but instead applies only to the continuous fluid loop between the two hydraulic machines.

Yet another embodiment is derived from a variation in the embodiment depicted in FIG. 2b. Referring again to that figure, regenerative braking passage 74 and check valve 72 may be eliminated by providing for a relatively simple modification of proportional valve 61. If proportional valve 61 were to incorporate a slightly offset butterfly disc, and were actuated in such a way that it would remain free to respond in a flow-induced manner, independently of its actuation, to flows in the second direction (to the right toward pump/motor 22), then regenerative braking flows could be accommodated independently of the actuation state of the valve. This could be accomplished with any number of direct actuation methods that would push the disc rotationally in a one-sided manner into an actuation position that opens it proportionally to fluid flow in one direction while remaining free to rotate further in response to fluid flow in the other direction.

Many variations of these embodiments will now be apparent to those skilled in the art. For example, the butterfly disc, depicted as circular in the figures, could be any variety of shapes, such as for example, elliptical or substantially rectangular. The disc could be of any appropriate thickness, or a varying thickness, could be attached to a distinct stem structure or formed in a single piece with the stem, and could have any appropriate edge finishing means to promote sealing or other performance objectives. Similarly the cam may be of any shape that serves the primary function of the cam which is to have contact with the cam follower surface over a range of angular rotation. The extension spring may be above or beneath the cam or oriented in a different direction than that depicted or affixed to different points. The cam and/or extension spring may be located above or below the sliding and rotating elements, and the butterfly disc may be located above or below the actuator mechanism. The cam follower surface may be oriented differently than that depicted, for example, at an angle with respect to the plane depicted, which would act to vary the principal biasing force profile encountered at various angular positions by rotation of the cam. The translational function here provided by the motor and threaded rod assembly may instead be provided by a servo mechanism, or a rack-and-pinion mechanism, or similar methods that are well known in the art.

With respect to the manifold design depicted in FIGS. 4a and 4b, many variations may be anticipated by those of ordinary skill in the art. The filter need not be integrated with the manifold but instead may be plumbed in a more ordinary way similarly to the cooler. Similarly, the cooling means could be integrated with the manifold in a way like that of the filter, or could take the place of the filter, or the filtration and cooling means could be switched in their locations with respect to the circuit. The check valve that enforces unidirectional flow through the filter could instead be placed on the inlet passage to the filter instead of at its outlet if packaging or assembly conditions suggest an advantage in doing so.

While extension springs and compression springs are depicted herein as a preferred biasing means, it is clear that other means such as elastic or resilient means could be provided instead, or any other means regarded as substantially equivalent by any practitioner of the art.

It is to be understood that any of the hydraulic circuits described in this disclosure could be implemented within the body of an integrated manifold as well as by means of individual fluid lines and connections, without departing from the scope of the invention.

In the claims, the term "fluid interface" refers to any means for providing for fluid flow between the hydraulic circuit and an external device such as a hydraulic machine or accumulator. It can include a single fluid passage or a fluid path having multiple branches and connections. "Fluid processing means" refers to any means for modifying one or more properties of working fluid, such as, for example, a filter, cooler, or de-aerator. "Flow checking means" refers to any device such as a check valve that substantially limits fluid flow to a single direction through a fluid passage. "Valve means" refers to a structure provided for regulating fluid flow within a passage, including at minimum a valve member for placement in a fluid passage and optionally also including any additional components that support its operation. Use of the term "juncture" need not indicate the presence of a physical manifestation of a fluid junction, such as for example a fitting or a branch, but may refer to a conceptual boundary between conceptually distinct fluid paths. The terms "joined" and "joining" generally refer to providing a path for fluid flow. The term "biasing force" may also refer to a biasing force profile consisting of a range or plurality of force magnitudes where applicable.

Having disclosed the embodiments and related examples found herein, many other variations on the foregoing embodiments will now be apparent to those skilled in the art. All of the U.S. patents, U.S. patent application publications, U.S. patent applications, foreign patents, foreign patent applications and non-patent publications referred to in this specification and/or listed in the Application Data Sheet, are incorporated herein by reference, in their entireties. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

The invention claimed is:

1. A multifunction fluid valve for governing flow within a fluid passage, comprising:
    a valve means, having its proportion of opening to fluid flow within the fluid passage being responsive at least in part to the action of fluid flow across the valve means;
    an actuator, including a first biasing means for establishing a first, principal biasing force for opposing opening of the valve means by action of fluid flow in a first direction across the valve means; and establishing an actuation state of the valve means that establishes a transitional valve opening position beyond which position the first biasing means is active to oppose further opening of the valve means by action of flow in the first direction across the valve means, and below which the first biasing means is not active; and
    a second biasing means providing a second biasing force opposing the opening of the valve means by action of fluid flow across the valve means, wherein the second biasing force is substantially smaller than the first, principal biasing force.

2. A multifunction fluid valve for governing flow within a fluid passage, comprising:
    a valve means, having its proportion of opening to fluid flow within the fluid passage being responsive at least in part to the action of fluid flow across the valve means, wherein said valve means comprises a rotating body, including: a valve member for placement within a fluid passage; a stem rotatable on an axis and rigidly engaged with the valve member; and a cam rigidly engaged with the stem so as to sweep a first plane substantially perpendicular to the stem as the stem rotates;
    an actuator, including a first biasing means for establishing a first, principal biasing force for opposing opening of the valve means by action of fluid flow in a first direction across the valve means; and establishing an actuation state of the valve means that establishes a transitional valve opening position beyond which position the first biasing means is active to oppose further opening of the valve means by action of flow in the first direction across the valve means, and below which the first biasing means is not active, wherein said actuator comprises:
        a cam follower, having a contacting surface for contacting the cam, and being movable in said first plane;
        a cam follower biasing means providing a cam follower biasing force that biases the cam follower against movement away from the stem axis; and
        a cam follower positioning means establishing a minimum distance between the stem axis and cam follower to which the cam follower may be moved by the cam follower biasing force; and wherein:
    said actuation state establishes said transitional valve opening position by result of the cam follower being positioned at said minimum distance by the cam follower biasing force so as to cause the cam to come into contact with the cam follower at a first angular position of the cam in an associated rotational direction away from an angular home position;
    said actuation state establishes said first, principal biasing force by result of the cam follower yieldably opposing further rotation of the cam beyond the first angular position by translating the cam follower biasing force to the cam by contact with the cam, thereby biasing the rotating body against rotation in the associated rotational direction within an angular range beginning at the first angular position; and
    said actuation state does not affect rotation of the rotating body in the rotational direction opposite the associated rotational direction.

3. The multifunction fluid valve of claim 2, wherein:
    the cam follower positioning means is selectively positionable so as to selectively establish said minimum distance.

4. The multifunction fluid valve of claim 2, additionally comprising:
    a second biasing means providing a second biasing force that biases the rotating body against rotation in the rotational direction opposite the associated rotational direction.

5. The multifunction fluid valve of claim 4, wherein:
    the valve member is an offset butterfly disc;
    the plane of the butterfly disc is substantially perpendicular to the flow axis of the fluid channel when the cam is in the angular home position;
    a compression spring disposed beneath the contacting surface of the cam follower provides the cam follower biasing force; and
    an extension spring connected at one end to a fixed point relative the axis of the stem, and at the other end to a point on the rotating body provides the second biasing force.

6. A hydraulic circuit, comprising:
    a first fluid interface for joining with a low pressure fluid port of a first hydraulic machine;
    a second fluid interface for joining with a low pressure fluid port of a second hydraulic machine;
    a first fluid passage joining the first fluid interface with the second fluid interface;
    a second fluid passage joining with the first fluid interface at a first juncture, and joining with the second fluid interface at a second juncture;
    a first fluid processing means disposed on the second fluid passage;
    a first multifunction fluid valve comprising:
        a valve means, having its proportion of opening to fluid flow within the fluid passage being responsive at least in part to the action of fluid flow across the valve means;
        an actuator, including a first biasing means for establishing a first, principal biasing force for opposing opening of the valve means by action of fluid flow in a first direction across the valve means; and establishing an actuation state of the valve means that establishes a transitional valve opening position beyond which position the first biasing means is active to oppose further opening of the valve means by action of flow in the first direction across the valve means, and below which the first biasing means is not active; and
        a second biasing means providing a second biasing force opposing the opening of the valve means by action of fluid flow across the valve means, wherein the second biasing force is substantially smaller than the first, principal biasing force;

the first multifunction fluid valve having its valve member disposed within the first fluid passage at a location between the first juncture and the second juncture, and oriented such that the first biasing means is active against flow in a direction away from the first juncture.

7. The hydraulic circuit of claim 6, wherein:
the first fluid processing means comprises a filter and a flow checking means substantially restricting flow to a single direction.

8. The hydraulic circuit of claim 6, additionally comprising:
a third fluid interface joining the hydraulic circuit with a low pressure fluid reservoir.

9. The hydraulic circuit of claim 6, additionally comprising:
a third fluid passage joining with the first fluid passage at a third juncture located between the first multifunction fluid valve and the second fluid interface, and joining with the second fluid passage at a fourth juncture located between the second juncture and the first fluid processing means;
a second fluid processing means disposed on the second fluid passage between the fourth juncture and the second juncture;
a second multifunction fluid valve;
comprising the same elements as the first multifunction fluid valve, the second multifunction fluid valve having its valve member disposed within the first fluid passage at a location between the second juncture and the third juncture, and oriented such that the first biasing means is active against flow in a direction toward the second juncture.

10. A hydraulic manifold, comprising:
a manifold body;
a first primary fluid passage for joining into fluid communication with a low pressure fluid port of a first hydraulic machine;
a second primary fluid passage for joining into fluid communication with a low pressure fluid port of a second hydraulic machine, and joined with the first primary fluid passage at a first juncture;
a first auxiliary fluid passage for joining with an input of a first auxiliary device, and joined with the first primary fluid passage at a second juncture located between the first juncture and the first hydraulic machine;
a multifunction fluid valve comprising:
a valve means, having its proportion of opening to fluid flow within the fluid passage being responsive at least in part to the action of fluid flow across the valve means;
an actuator, including a first biasing means for establishing a first, principal biasing force for opposing opening of the valve means by action of fluid flow in a first direction across the valve means; and establishing an actuation state of the valve means that establishes a transitional valve opening position beyond which position the first biasing means is active to oppose further opening of the valve means by action of flow in the first direction across the valve means, and below which the first biasing means is not active; and
a second biasing means providing a second biasing force opposing the opening of the valve means by action of fluid flow across the valve means, wherein the second biasing force is substantially smaller than the first, principal biasing force;
said multifunction fluid valve having its valve member disposed within the first primary fluid passage at a location between the first juncture and the second juncture, and oriented such that the first biasing means is active against flow in a direction from the first primary fluid passage toward the second primary fluid passage.

11. The hydraulic manifold of claim 10, additionally comprising:
a common fluid passage joining with or embodying at least a portion of the first juncture between the first and second primary passages;
a second auxiliary fluid passage for joining with an output of the first auxiliary device, and joined with the common fluid passage;
a third auxiliary fluid passage for joining with an input of a second auxiliary device, and joined with the common fluid passage;
a second multifunction fluid valve comprising the same elements as the first multifunction fluid valve,
the second multifunction fluid valve having its valve member disposed within the second primary fluid passage, and oriented such that the first biasing means is active against flow in a direction from the common fluid passage toward the second primary fluid passage.

12. The hydraulic manifold of claim 11, additionally comprising:
a third primary fluid passage for joining with a low pressure reservoir and joined with the common fluid passage.

13. The hydraulic manifold of claim 11, additionally comprising:
a flow checking means disposed on the first or second auxiliary fluid passage so as to substantially restrict flow to a single direction; and
the first auxiliary device being a fluid filter.

14. The hydraulic manifold of claim 11, wherein:
the first and second auxiliary fluid passages join within a common cartridge port.

* * * * *